US006098014A

United States Patent [19]

[11] Patent Number: 6,098,014

[45] Date of Patent: Aug. 1, 2000

Kranz

[54] AIR TRAFFIC CONTROLLER PROTECTION SYSTEM

[76] Inventor: Peter Kranz, 145 Nearwater La., Darien, Conn. 06820

[21] Appl. No.: 07/696,079

[22] Filed: May 6, 1991

[51] Int. Cl.[7] .............................. G06G 7/72; G09B 9/02; G09B 9/50; G08G 5/00

[52] U.S. Cl. .............................. 701/120; 244/76

[58] Field of Search .............................. 364/439, 424.01, 364/424.06; 381/52; 701/120, 200, 210; 244/76

[56] References Cited

U.S. PATENT DOCUMENTS

| | | | |
|---|---|---|---|
| 3,745,671 | 7/1973 | Mortimer | 434/30 |
| 4,490,117 | 12/1984 | Parker | 434/35 |
| 4,685,135 | 8/1987 | Lin et al. | 381/52 |
| 4,692,941 | 9/1987 | Jacks et al. | 381/52 |
| 4,706,198 | 11/1987 | Thurman | 364/439 |
| 4,949,267 | 8/1990 | Gerstenfeld et al. | 364/439 |
| 4,979,137 | 12/1990 | Gerstenfeld et al. | 395/500.29 |
| 5,025,382 | 6/1991 | Artz | 364/439 |
| 5,111,400 | 5/1992 | Yoder | 364/424.01 |

OTHER PUBLICATIONS

"Future ATC Automation Aids Based upon AI Technology" by J.A. Scardina et al., Proceedings of IEEE, vol. 77, No. 11, Nov. 1989, pp. 1625–1633.

Findler, "Air Traffic Control: A Challenge for Artificial Intelligence," Jan. 1987, pp. 59–66, AI Expert.

Perry, "Improving the World's Largest, Most Advanced System," Feb. 1991, pp. 22–36, IEEE Spectrum.

*Primary Examiner*—Eric W. Stamber

*Assistant Examiner*—Hugh Jones

*Attorney, Agent, or Firm*—Sprung Kramer Schaefer & Briscoe

[57] ABSTRACT

An air traffic control system which prevents a human air traffic controller from speaking directly with an aircraft crew, but which receives instructions from a human air traffic controller, understands their semantic meaning, integrates the semantic meaning of these instructions with specified parameters to maximize safety of the aircraft, and transmits them to the aircraft crew through a computer generated voice message.

2 Claims, 1 Drawing Sheet

AIR TRAFFIC CONTROLLER PROTECTION SYSTEM

FIELD OF THE INVENTION

This invention relates to Air Traffic Control systems.

BACKGROUND OF THE INVENTION

The purpose of the Air Traffic Control system at airports is to observe and control the movement of aircraft in the vicinity of the airport, both in the air and on the ground. The key factor in the successful operation of such a system is an individual, frequently called the Air Traffic Controller. This individual has responsibility for positioning of various aircraft; he/she communicates with the aircraft through a radio system. The Controller is assisted by various means; visual contact with the aircraft where feasible, radar contact, radio voice contact and other position indicators. The responsibility includes all observation of the target aircraft and all decisions concerning the movement of the aircraft and how this should be integrated with that of other aircraft and other physical objects in the vicinity of the airport.

It can be seen that the responsibilities of the Controller are extensive, and further that an error by the Controller can result in the loss of the aircraft and the death of many people, both aboard the aircraft as well as some of those on the ground. A recent example of such an error was the fatal accident in Los Angeles, when a Controller mistakenly directed two aircraft to use the same runway, one for landing an aircraft where the Controller had previously directed a different aircraft to use the same runway for taking off.

SUMMARY OF THE INVENTION

It is therefore the principal object of the present invention to provide an improvement in the system used by the Air Traffic Controller to reduce the likelihood of a mistake, with the attendant serious consequences.

To the accomplishment of the above, this invention consists of a Computer Intermediary which isolates the Controller from direct contact with the aircraft. The application of this invention may be understood from FIG. 1, where the present Controller system is shown, contrasted with the use of the Computer Intermediary.

DETAILED DESCRIPTION OF THE DRAWING

Figure 1:
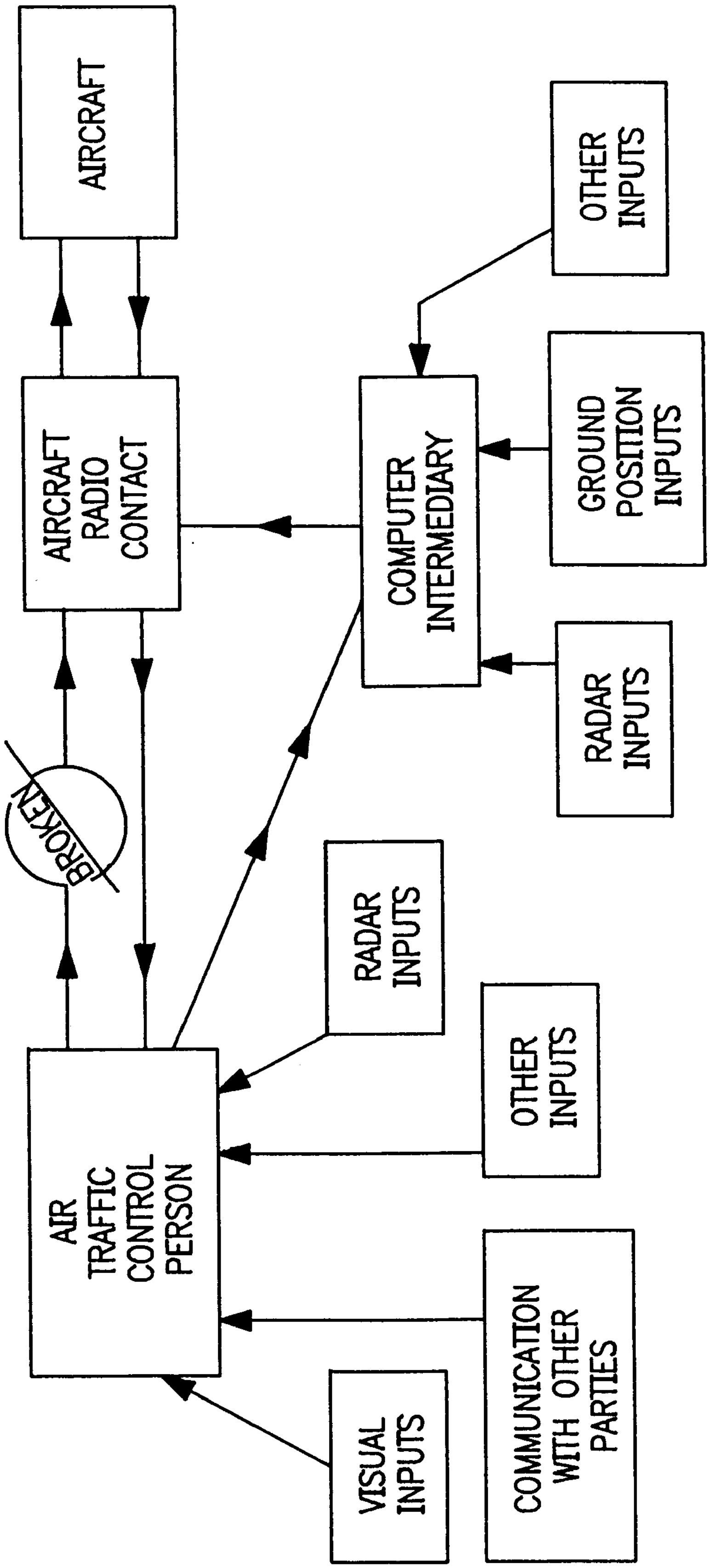
FIG. 1 depicts a flow diagram for a conventional air traffic control system to which the improvement of the present invention has been added.

FIG. 1 depicts an air traffic control person (1), who receives visual, radar and other input (2*a*), (2*b*), (2*c*), (2*d*) as well as direct communication (3) from an aircraft (4) through the aircraft's radio contact (3*a*).

The controller issues instructions (5) to the aircraft which, in accordance with the invention are diverted from and not received by the aircraft radio contact. Instead, the instructions are diverted electronically (6) to computer intermediary (7). Computer intermediary (7), which receives radar input (8), ground position inputs (9) and other inputs (10) checks the instructions for accuracy and then retransmits (11) them to the aircraft radio contract.

In accordance with the present invention, direct radio contact from the Controller to the aircraft is not possible, except in emergency situations, when the Air Traffic Controller must override the Computer Intermediary. Rather the Controller communicates with the Computer Intermediary. The easiest present system would be typing instructions into a terminal, using the same natural language the Controller would use with the aircraft. Thus the Controller would type sentences as the following, precisely the same sentences the Controller now speaks into the microphone:

"Permission granted to United Flight 876 to land on runway 230"

"United Flight 876 should hold in pattern Eight"

"Warning to all landing aircraft; there are patches of lower visibility on some runways," etc.

For the purposes of this invention, I assume the Controller types the instructions into a terminal. However, computer systems are beginning to appear that have some limited ability to understand spoken language, and in the future it is certain these will be employed in conjunction with a Computer Intermediary, as described herein. In accordance with the present invention it does not matter what precise form of communication is used between the Air Traffic Controller and the Computer Intermediary.

The Computer Intermediary uses a program that understands the semantic purpose of the Controller's instruction. This inventor is skilled in this process and has presently operating a program that would readily and without error understand the Air Traffic Controller's instructions. The means by which the computer program functions is through determination of semantic intent for each sentence. In an environment of limited semantic extent, one knows there is only a finite number of ideas or expressions that can be exchanged. There probably are less than one thousand different ideas, but it is not important whether this number is one thousand or three thousand or even just three hundred. In all events it is a limited number and well within the capability of a computer to address the separate ideas that make the essence of any particular sentence. Different words may be used, different means for stating a particular idea may be used, but these differences can be matched to a specific idea. We might call this a category of individual sentence meaning. (See Kranz, Behavioral Science, 15:286, May 1970.)

Likewise, it is clear that each sentence does not stand by itself; the meaning of any sentence is bound to those that precede it. Thus the categories to earlier sentences must be considered as each sentence is understood. An important advantage of a system with semantic categories is the need to match the ideas within the ongoing sentence, as well as preceding sentences. If a precise match does not occur, the Computer Intermediary knows it does not understand the sentence, and it can tell this to the Air Traffic Controller.

In the specific instance of Air Traffic Control at airports, it is also clear that other inputs will be important for safe operation. Thus radar data, sensors on the ground, and comments of other observers should be integrated into a coherent overview. The Computer Intermediary will:

1) Understand the meaning, the semantics, of the Air Traffic Controller's instruction.

2) Integrate this meaning with all the other instructions that this Controller and others have made that would influence the aircraft.

3) Take input from radar and ground sources to complement the instructions from the Controller, and coordinate all these inputs.

4) If there is an error, the Computer Intermediary would communicate directly back to the Air Traffic Controller and state what was wrong.

5) If the instruction was consistent with all the other radar and ground input, the computer would generate a voice command that would repeat the Controller's initial command.

To one skilled in the art, it will be clear that items (2), (3), and (4) above, while not trivial programming problems, nonetheless are readily accomplished. The last step, computer generated voice messages, has also been reduced to practice, for example at Bellcore, the research facility of the telephone regional companies.

What is claimed is:

1. An air traffic control system comprising a computer intermediary which intercepts instructions issued by a human air traffic controller to an aircraft, checks the instructions against a data base of known conditions on the ground and in the air for logical accuracy, and retransmits the instructions to said aircraft if logically accurate, but, if not logically accurate, sends an error signal back to the human air traffic controller instead, said computer intermediary itself comprising a computer with means to understand sentences expressed by said human air traffic controller and compare the meaning of said sentences with other relevant inputs to detect logical inaccuracy or inconsistency in the instructions because of contradictory conditions.

2. A method of controlling air traffic at an airport comprising a) making an opinion determination as to instructions to be supplied to an aircraft, b) providing such instructions to a computer, c) permitting the computer to compare such instructions with known conditions on the around and in the air for possible contradiction therebetween, and d)

i) if no contradiction, passing said instructions on to the aircraft, or ii) if contradictory, not passing said instructions on and alerting an operator.

* * * * *